US010599349B2

(12) United States Patent
Choi et al.

(10) Patent No.: US 10,599,349 B2
(45) Date of Patent: Mar. 24, 2020

(54) METHOD AND APPARATUS OF DYNAMIC PARALLELISM FOR CONTROLLING POWER CONSUMPTION OF SSDS

(71) Applicant: Samsung Electronics Co., Ltd., Gyeonggi-do (KR)

(72) Inventors: Inseok Stephen Choi, Redwood City, CA (US); Byoung Young Ahn, San Jose, CA (US); Yang Seok Ki, Palo Alto, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 306 days.

(21) Appl. No.: 15/076,504

(22) Filed: Mar. 21, 2016

(65) Prior Publication Data
US 2017/0075611 A1 Mar. 16, 2017

Related U.S. Application Data

(60) Provisional application No. 62/217,772, filed on Sep. 11, 2015.

(51) Int. Cl.
G06F 1/26 (2006.01)
G06F 3/06 (2006.01)
(52) U.S. Cl.
CPC .......... G06F 3/0625 (2013.01); G06F 3/0634 (2013.01); G06F 3/0688 (2013.01); Y02D 10/154 (2018.01)
(58) Field of Classification Search
CPC ..................................... G06F 1/32; G06F 1/26
See application file for complete search history.

(56) References Cited

U.S. PATENT DOCUMENTS

| 7,152,142 | B1* | 12/2006 | Guha | G06F 3/0625 711/114 |
|---|---|---|---|---|
| 8,555,095 | B2 | 10/2013 | Byom et al. | |
| 8,677,051 | B2 | 3/2014 | Tanaka et al. | |
| 8,904,085 | B2 | 12/2014 | Hobbet et al. | |
| 2005/0144486 | A1* | 6/2005 | Komarla | G06F 1/3203 713/300 |
| 2005/0210304 | A1* | 9/2005 | Hartung | G06F 1/3203 713/320 |

(Continued)

OTHER PUBLICATIONS

U.S. Appl. No. 14/967,220, filed Dec. 11, 2015, entitled "Dynamic Non-Volatile Memory Operation Scheduling for Controlling Power Consumption of Solid State Drives," 38 pp.

(Continued)

Primary Examiner — Phil K Nguyen
(74) Attorney, Agent, or Firm — Van Pelt, Yi & James LLP

(57) ABSTRACT

Embodiments are disclosed for adaptive power reduction for a solid-state storage device to dynamically control power consumption. Aspects of the embodiments include receiving a power limit command from a host; receiving power consumption feedback; using the power limit command and the power consumption feedback to calculate a new degree of parallelism; using the new degree of parallelism to control one or more of: i) processor parallelism, including activation of different numbers of processors, ii) memory parallelism, including memory pool length; and iii) nonvolatile memory parallelism, including activation of different numbers of nonvolatile memory devices.

19 Claims, 9 Drawing Sheets

(56) References Cited

U.S. PATENT DOCUMENTS

| | | | |
|---|---|---|---|
| 2006/0053338 A1* | 3/2006 | Cousins | G06F 11/008 714/6.12 |
| 2007/0245161 A1* | 10/2007 | Shaw | G06F 1/3203 713/300 |
| 2009/0158070 A1* | 6/2009 | Gruendler | G06F 11/2015 713/340 |
| 2009/0271645 A1* | 10/2009 | Mori | G06F 1/3221 713/320 |
| 2009/0316541 A1* | 12/2009 | Takada | G06F 1/3221 369/47.5 |
| 2010/0162006 A1* | 6/2010 | Therien | G06F 1/3203 713/300 |
| 2010/0235840 A1* | 9/2010 | Angaluri | G06F 1/329 718/102 |
| 2010/0275050 A1* | 10/2010 | Hong | G06F 1/266 713/324 |
| 2011/0258367 A1* | 10/2011 | Tanaka | G06F 1/3203 711/103 |
| 2013/0097433 A1 | 4/2013 | Boorman et al. | |
| 2013/0124888 A1 | 5/2013 | Tanaka et al. | |
| 2014/0149640 A1 | 5/2014 | Burke et al. | |
| 2014/0359196 A1* | 12/2014 | Ragland | G06F 3/0634 711/102 |
| 2014/0359269 A1 | 12/2014 | Moen et al. | |
| 2015/0106644 A1* | 4/2015 | Lin | G06F 11/3062 713/340 |
| 2015/0309751 A1* | 10/2015 | Ellis | G06F 3/0659 711/154 |
| 2015/0309752 A1* | 10/2015 | Ellis | G06F 3/0625 711/103 |
| 2016/0085288 A1* | 3/2016 | Khatib | G06F 1/3221 713/320 |
| 2016/0092116 A1* | 3/2016 | Liu | G11C 5/025 711/103 |
| 2016/0139964 A1* | 5/2016 | Chen | G06F 1/3206 718/104 |
| 2016/0372160 A1* | 12/2016 | Lehmann | G11C 5/14 |
| 2017/0060208 A1* | 3/2017 | Sawai | G06F 1/3268 |

OTHER PUBLICATIONS

U.S. Appl. No. 14/967,266, filed Dec. 11, 2015, entitled "System and Method for Controlling Power Consumption," 39 pp.

U.S. Appl. No. 14/976,309, filed Dec. 21, 2015, entitled "Solid State Memory System with Power Management Mechanism and Method of Operation Thereof."

* cited by examiner

| Degree of Parallelism | Processor | Memory | NVM Memory |
|---|---|---|---|
| Level 0 | 1 core | 25% | 4 buffers |
| Level 1 | 2 cores | 50% | 3 buffers |
| Level 2 | 3 cores | 75% | 2 buffers |
| Level 3 | 4 cores | 100% | 1 buffer |

Parallelism Mapping Table

FIG. 3B

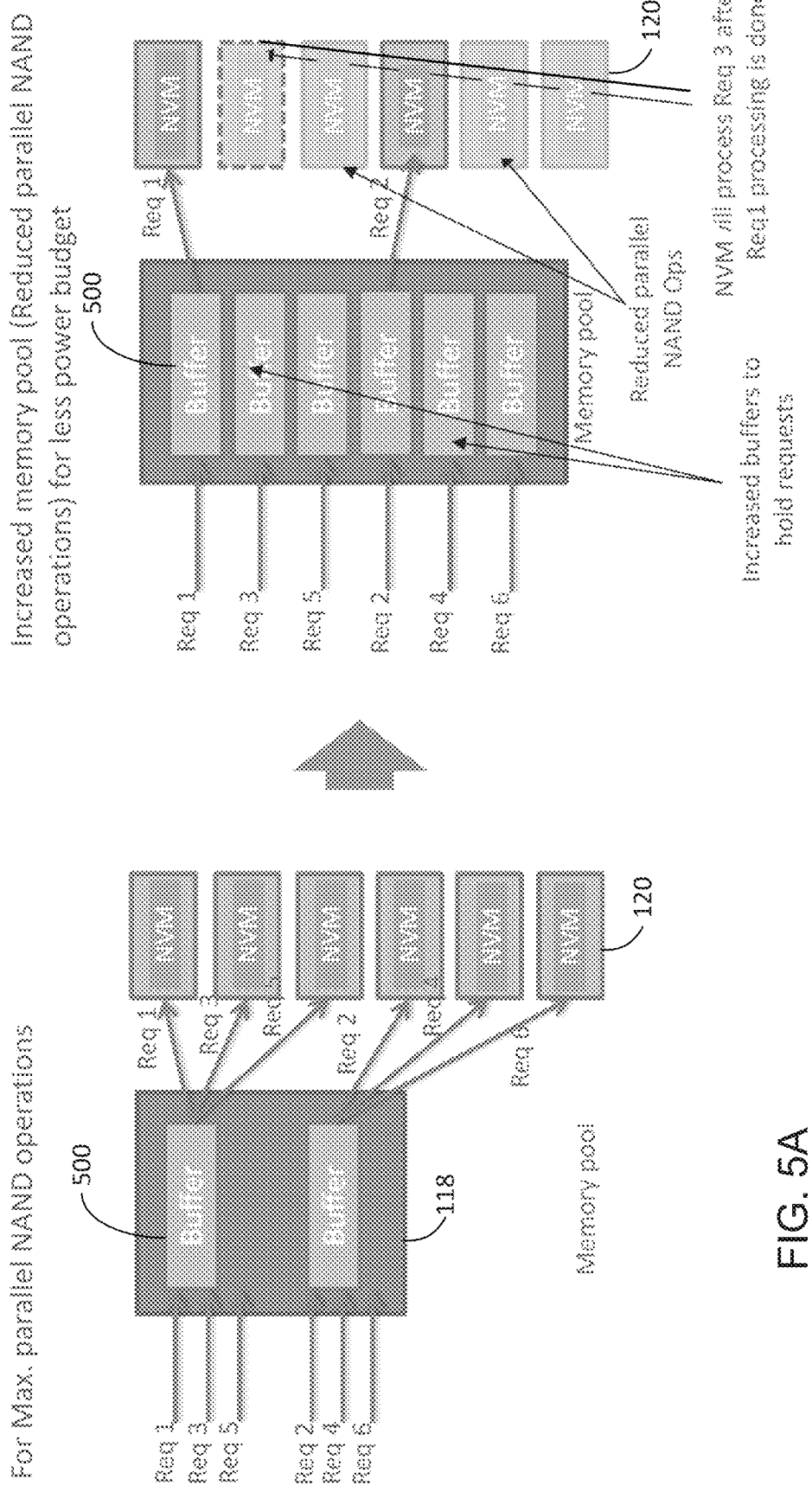

METHOD AND APPARATUS OF DYNAMIC PARALLELISM FOR CONTROLLING POWER CONSUMPTION OF SSDS

CROSS-REFERENCE TO RELATED APPLICATIONS

This application claims the benefit of priority to U.S. Provisional Application No. 62/217,772, filed on Sep. 11, 2015, incorporated herein by reference.

BACKGROUND

Power consumption of electric devices has become a critical metric along with traditional performance metrics, both for data center and consumer markets. In data centers, it is well known that the cooling cost can take up to one third of the total operating cost, so power consumption cannot be a low priority consideration any more. In addition to this, modern data center servers are adopting high performance solid-state drives (SSDs), such as nonvolatile memory (NVM) Express or NVMe compliant devices. NVMe is a specification for accessing solid-state drives (SSDs) attached through the PCI Express (PCIe) bus. An NVMe device commonly comes with high-performance CPUs and large dynamic random-access memories (e.g., DRAMs) to provide higher performance compared to other SSDs. Such high-performance devices can easily consume 25 W, which is a significant amount of power consumption, even in the data center configuration considering that commodity servers are commonly equipped with 8-16 such SSDs. Moreover, energy proportionality—that is, for low utilization of a given device, proportionally low power consumption, is expected. The same principle is directly applicable to consumer markets. Consumer mobile devices, such as laptops, are adopting high performance SSDs, such as PCIe-based SSDs. As such, power consumption of SSDs should be minimal when not in use. To do so, such SSDs should provide power-consumption control features.

Modern SSDs commonly come with performance throttling features, lowering its performance to reduce power consumption, mainly to protect itself from exceeding a power threshold over an allowed power consumption, which is commonly referred to as thermal design power (TDP). Such a mechanism, however, is mainly designed to protect circuits from thermal or electric damages by getting too hot or flowing too much current, respectively. But, this feature is insufficient to accommodate dynamic power control.

Due to its small cell size, high density, low power and high endurance, modern SSDs commonly utilize NAND flash memory as storage media. NAND flash has asymmetric latency and power consumption characteristics.

To boost its performance, hide high latency in programming and erasing due to the asymmetric characteristics of NAND flash memory, many different-levels or types of parallelisms are used. For example, multiple micro-controllers or general processors exist in SSDs to implement a Flash File System to mimic hard disk drives. That is to say, multiple CPUs execute the SSD's firmware that commonly incorporates an FTL (Flash Translation Layer). FTL translates LBA (logical block address) to PBA (physical block address) while taking charges of bad block management, garbage collection, and wear leveling. Because modern FTLs are complicated and requires high computation, multiple CPUs are commonly used to parallelize its task and also to execute user commands simultaneously. A second type of parallelism can be found in DRAM memory. DRAM is much slower than processors, and thus, DRAM organization commonly utilizes parallelism in its organization. Multi-rank or channel is an example. Lastly, NAND media and its organization introduces its own parallelism, including multi-plane, interleave, and multi-channel operations.

Although such parallelism can be controlled either directly from a host or user, or self-controlled based on configuration tables that manufacturers preconfigure, to control average power consumption of SSDs, there is currently no mechanism to dynamically control power consumption during operation.

What is needed is a mechanism to control power consumption of SSDs utilizing dynamically configurable parallelism.

BRIEF SUMMARY

The example embodiments provide methods and systems for adaptive power reduction for a solid-state storage device to dynamically control power consumption. Aspects of the embodiments include receiving a power limit command from a host; receiving power consumption feedback; using the power limit command and the power consumption feedback to calculate a new degree of parallelism; and using the new degree of parallelism to control one or more of: i) processor parallelism, including activation of different numbers of processors, ii) memory parallelism, including memory pool length; and iii) nonvolatile memory parallelism, including activation of different numbers of nonvolatile memory devices.

The example embodiments also provide a storage device, comprising: a volatile memory; a plurality of processors coupled to the volatile memory; a nonvolatile memory array; and a control circuit coupled to the volatile memory, the plurality of processors and the nonvolatile memory array, the control circuit configured to: receive a power limit command from a host; receive power consumption feedback; use the power limit command and the power consumption feedback to calculate a new degree of parallelism; and use the new degree of parallelism to control one or more of: i) processor parallelism, including activation of different numbers of processors, ii) memory parallelism, including memory pool length; and iii) nonvolatile memory parallelism, including activation of different numbers of nonvolatile memory devices.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which:

FIG. 3B is a diagram illustrating an example embodiment where the parallelism control mechanism is implemented as a parallelism mapping table;

FIGS. 5A-5C are conceptual drawings showing an example of dynamic parallelism for controlling power consumption of the SSD via dynamic memory pool control for queueing requests towards the NVM devices; FIG. 6A shows NVM memory accesses being interleaved across multiple NVM device locations simultaneously.

DETAILED DESCRIPTION

Figure 1:
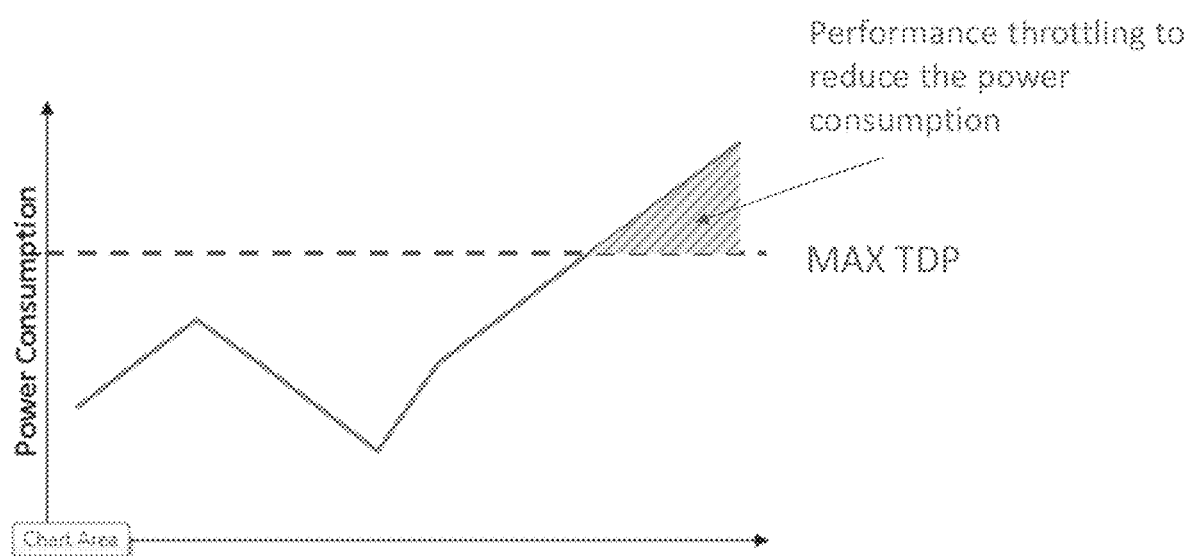
FIG. 1 is an example graph for conventional performance throttling to protect an SSD.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Modern solid state devices (SSDs) are commonly equipped with a performance throttling feature that lowers the performance of an SSD to reduce its power consumption. FIG. 1 shows an example graph for conventional performance throttling to protect an SSD. The performance throttling feature primarily protects circuits and components of the SSD from exceeding a power threshold over allowed power consumption, herein referred to as thermal design power (TDP). By forcefully reducing the power consumption or even turning off the power, the performance throttling feature prevents the circuits and components of the SSD from thermal or electric damages when the SSD runs too hot or allows too much current. However, a conventional performance throttling feature merely responds to a temperature reading from a thermostat or a power meter of the system, thus it may not be adequate to dynamically control power consumption of the SSD. For example, one drawback is that performance throttling cannot adapt to a dynamic power-consumption limit.

According to one embodiment, the present disclosure provides adaptive power reduction for nonvolatile memory devices, such as an SSD, to dynamically control power consumption responsive to a dynamic power limit. More specifically, a method and apparatus is disclosed for dynamic parallelism for controlling power consumption of SSDs.

Figure 2:
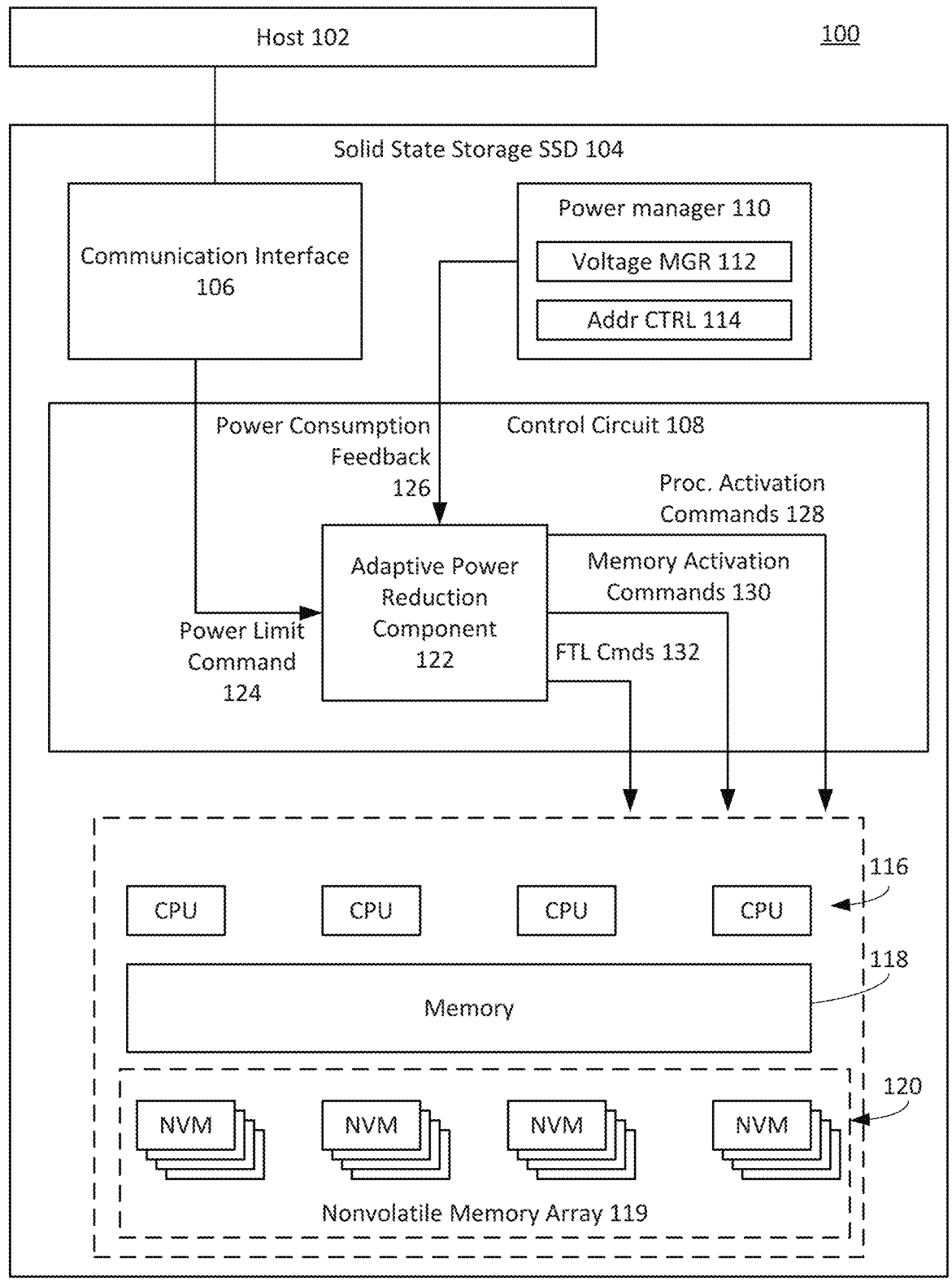
FIG. 2 is a block diagram illustrating an example embodiment of an adaptive power reduction system for a nonvolatile memory device, such as an SSD, that controls power consumption of the SSD using dynamically configurable parallelism.

FIG. 2 is a block diagram illustrating an example embodiment of an adaptive power reduction system for a nonvolatile memory device that controls power consumption of the SSD using dynamically configurable parallelism. The system 100 may include a nonvolatile memory device, such as solid-state drive (SSD) 104 that is coupled to host 102. The SSD 104 may include a communication interface 106, a control circuit 108, a power manager 110, one or more processors or CPUs 116, a memory 118, and a nonvolatile memory array 119, which in one embodiment may comprise an array of nonvolatile memory (NVM) devices 120 (e.g., NAND media).

The communication interface 106 enables the SSD 104 to communicate with the next level system, such as the host 102. The communication interface 106 may transfer device operation commands and user data for processing in the SSD 104. The communication interface 106 may comprise serial attached SCSI (SAS), serial ATA (SATA), NVM Express (NVMe), Fiber channel (FC), Ethernet, remote direct memory access (RDMA), or the like.

In one embodiment, the SSD 104 may comprise multiple processors or CPUs 116 and multi-rank NVM devices 120 to provide more I/O's per device. The processors 116 may have interfaces for physically and logically connecting to, and communicating with, multiple NVM devices 120. In one embodiment, processing for the NVM devices 120 may include executing firmware such as a Flash Translation Layer (FTL), which may handle bad block management, garbage collection, and wear leveling. The processors 116 may be general purpose processors, digital signal processors (DSPs), application specific integrated circuits, microcontrollers, programmable logic devices, discrete circuits, a combination of such devices, or the like. The processors 116 may include internal portions, such as registers, cache memory, processing cores, or the like, and may also include external interfaces, such as address and data bus interfaces, interrupt interfaces, or the like.

The memory 118 can be used as a scratch pad for the processors 116 in order to maintain command execution status, power level restrictions, and configuration of the nonvolatile memory array 119, including the NVM devices 120. In an embodiment, NVM devices 120 may contain NAND cells arranged in multiple planes that allow for parallel access to the NVM devices 120 as well as allowing for interleaving. Although the present disclosure may be described in terms of NAND flash devices, the SSD 104 may alternatively include array of other types of non-volatile memory devices, such as multi-level cell (MLC) flash memory (e.g., single-level cell (SLC), multi-level cell (MLC), including triple-level cell (TLC) and quadruple level cell (QLC)), Ferroelectric random access memory, spin-transfer torque magentoresistive random access memory (STT-MRAM), or Phase-Change RAM, or the like.

The control circuit 108 may be coupled to the communication interface 106, the processors 116, the memory 118 and the nonvolatile memory array 119. The control circuit 108 may comprise a general purpose processor, a digital signal processor (DSP), an application specific integrated circuit, a microcontroller, a programmable logic device, discrete circuits, or the like similar to the processors 116. In one embodiment, the control circuit 108 may also function as part of a storage controller.

Many different-level parallelisms co-exist inside the SSD 104 from the perspective of the processors 116, memory 118 and the nonvolatile memory array 119. For example, because the FTL can be complicated and requires high computation, the SSD 104 may utilize processor parallelism in which multiple processors 116 are used to parallelize tasks and also to execute user commands simultaneously.

A second type of parallelism is memory parallelism of memory 118 (e.g., DRAM). The memory 118 is much slower than processors 116, and thus, memory organization commonly utilizes parallelism in its organization. Memory pool-length and utilization of ranks or channels are examples.

A third type of parallelism is nonvolatile memory parallelism with respect to the nonvolatile memory array 119, i.e. the NVM devices 120, and its organization. This parallelism may be achieved by a memory controller of the SSD simultaneously servicing multiple memory operations to/from the NVM devices 120. Such simultaneous operations may utilize multiple memory channels, interleaving, and multiple planes. Some parallelism is based on NVM array organization, but other parallelisms may rely on NVM chip construction, such as through multiple planes. Traditionally, the parallelism is mainly used to boost SSD performance without considering the increased power consumption, except only for the performance throttling in terms of the TDP. Until the total power consumption exceeds the TDP, a conventional SSD fetches as many operations as possible to achieve the maximum performance. However, such parallelism is not always efficient when power consumption is considered.

According to the example embodiment, the system 100 provides an adaptive power reduction component 122 to dynamically control power consumption of the SSD 104 using dynamically configurable parallelism. The adaptive power reduction component 122 may be configured to efficiently control the degrees of parallelism when the device is power constrained by decreasing performance of the SSD 104 in order to meet the power constraints. By doing so, the power consumption of the SSD 104 may be dynamically controlled or configured. The adaptive power reduction component 122 may be implemented within the control circuit 108 and outside of the nonvolatile memory array 119, thereby providing controller-side dynamically configurable parallelism. In one embodiment, the adaptive power reduction component 122 may be implemented as hardware, or as a software component executing on a hardware logic device, such as a processor.

According to the example embodiment, the adaptive power reduction component 122 receives both a power limit command from the host 102, and power consumption feedback 124. The adaptive power reduction component 122 uses the power limit command 124 and the power consumption feedback 126 to calculate a new degree of parallelism for the SSD 104. This new degree of parallelism is then used to control activation of different numbers of processors, memory pool length and NVM media parallelism, including a number of active channels, ways and planes, of the SSD. In the embodiment shown, the adaptive power reduction component 122 is shown within the control circuit 108, but may be located or executed outside of the control circuit. In one embodiment, control of the parallelism may be implemented through a parallelism control mechanism, including but not limited to, the use of one or more parallelism mapping tables, proportional-integral-derivative control, iterative methods: such as Nelder-Mead methods, machine learning, and optimization techniques, such as a neural network.

In one embodiment, the power limit command 124 may include an allowed power budget over a given time window. In an embodiment where the adaptive power reduction component 122 includes a separate microcontroller, the microcontroller may receive a communication from the host 102 that indicates a particular power level through a communication bus. However, the power limit 112 may be received in other ways depending on the particular circuitry of the control circuit 108. In one embodiment, the power budget may be divided into a series of time windows (e.g., T1, T2, T3, and T4 representing time periods for assigning a power budget and controlling power consumption). The length of the time windows may vary depending on system configuration, applications, and/or the desired granularity of the power consumption control. In on example, the time windows may be uniform, but the time windows may be also adjusted dynamically depending on various factors.

In one embodiment, the power consumption feedback 126 represents measurements of power consumption of the processor 104, memory 118 and the nonvolatile memory array 119. In one embodiment, the control circuit 108 may receive the power consumption feedback 126 from the power manager 110. In another embodiment, the control circuit 108 may receive the power consumption feedback 126 from direct connections to the processors 116, the memory 118, and the nonvolatile memory array 119, or the like to read a power meter of the processor 104, the memory 118, and the nonvolatile memory array 119. In a further example, the control circuit 108 may include an arithmetic logic unit or other circuitry configured to calculate an estimate of a power consumption of one or more of the processors 119, memory 118, and the nonvolatile memory array 119.

In the embodiment where the control circuit 108 receives the power consumption feedback 126 from the power manager 110, the control circuit 108 may be coupled to the power manager 110. The power manager 110 can monitor power consumption and can alter the operating configuration of the SSD 104 by adjusting the voltage level of write/erase voltages, removing power from memory segments of non-volatile memory array 119, altering addressing of segments, or a combination thereof.

The power manager 110 can include a voltage manager unit 112 and an address control unit 114. The power manager 110 can adjust the operational voltages used to read, write, and erase the segments of the non-volatile memory array 119, including source voltages and threshold voltages. The power manager 110 can completely disconnect some of the segments of the non-volatile memory array 119 from the source voltages in the event of severe power limitations. The voltage manager unit 112 can configure the nonvolatile memory 119 for reduced performance operation based on power restrictions specified by the control circuit 108, as described below. The reduced performance operation can include reduced operational bandwidth, extended execution times, reduced capacity, or a combination thereof. The voltage manager unit 112 can also monitor a voltage feedback in order to verify the limit established by the power manager 110 is not exceeded. The address control unit 114 can modify the configuration and addressing of memory segments, including chips, memory elements, or pages within the non-volatile memory array 119 in order to execute the user data commands, while under some level of the power limitation command. The address control unit 114 can accommodate the restricted use of some of the segments of the non-volatile memory array 119 in order to satisfy the demand placed on the power manager 110.

Based on the power limit command 124 and the power consumption feedback 126, the adaptive power reduction component 122 may iteratively change multiple operating parameters of the processor 116, the memory 118 and the devices comprising the nonvolatile memory array 119 so that the operating power consumption of the SSD 104 is less than or equal to a power budget as specified by the power limit command 100. In one embodiment, this optimization may be performed dynamically during run time.

According the to an example embodiment, the adaptive power reduction component 122 may change the operating parameters by invoking one or more of processor activation commands 128, memory activation commands 130, and FTL commands 132 (also referred to herein as nonvolatile memory commands). In another embodiment, the operating parameters may include any parameter of the processors 116, the memory 118, and the nonvolatile memory array 119 that may be controlled to affect performance and/or power consumption. In one embodiment, the adaptive power reduction component 122 may be configured to write to registers of one or more of the processors 116, the memory 118 and the nonvolatile memory devices 120. In another embodiment, the adaptive power reduction component 122 may transmit a control signal to a voltage regulator to cause the voltage manager 112 to output a different voltage to one or more of the processors 116, the memory 118 and the nonvolatile memory 120.

In one embodiment, the adaptive power reduction component 122 may be implemented as a software component. In another embodiment, the adaptive power reduction component 122 could be implemented as a combination of hardware and software. Although the adaptive power reduction component 122 is shown as a single component, the functionality of the adaptive power reduction component 122 may be divided into a greater number of modules/components.

Figure 3A:
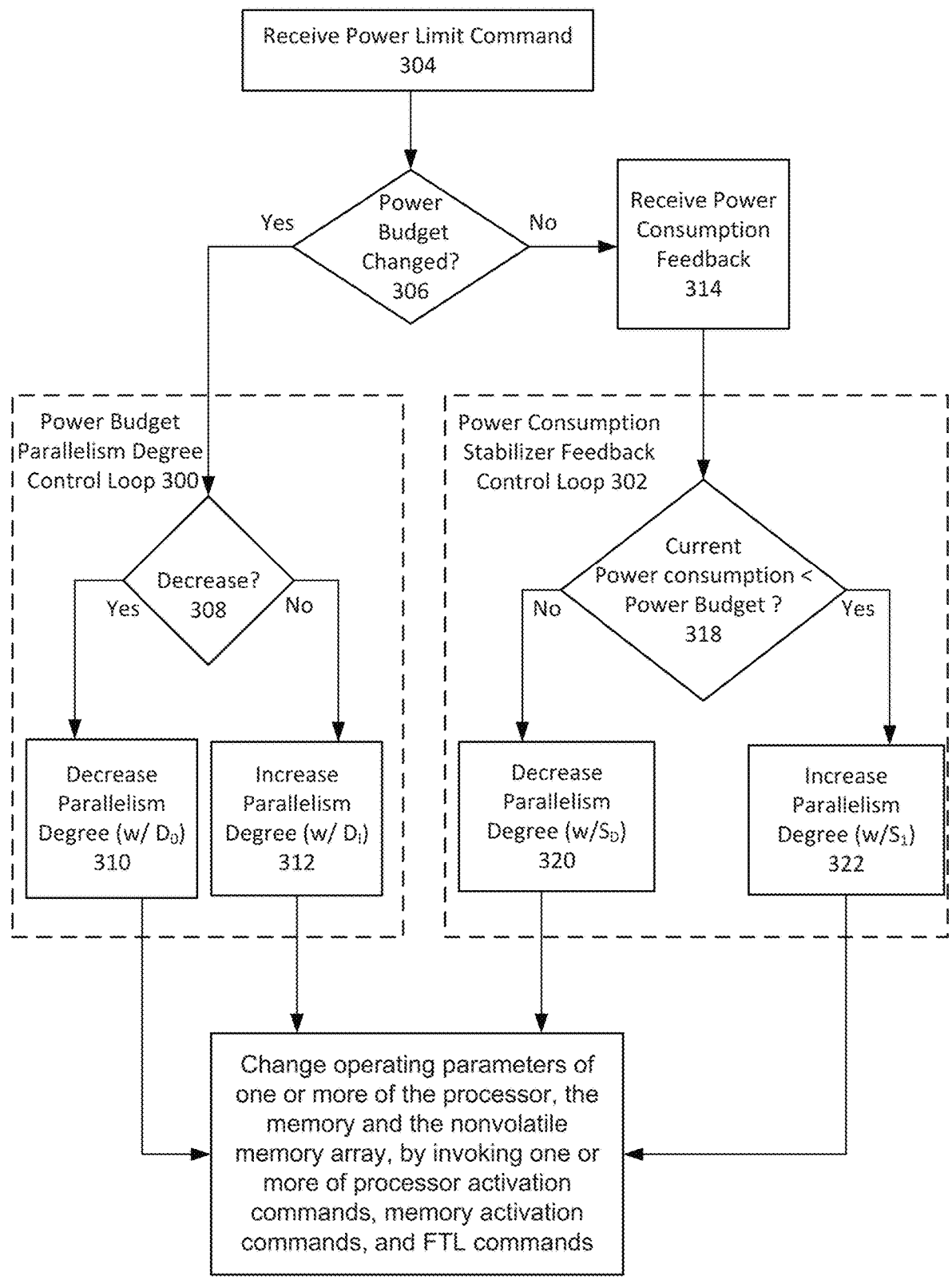
FIG. 3A is a flow diagram illustrating the process for adaptive power reduction for the SSD to dynamically control power consumption during operation.

FIG. 3A is a flow diagram illustrating the process for adaptive power reduction for the SSD to dynamically control power consumption during operation. In one embodiment, the process is primarily performed by the adaptive power reduction component 122. According to one embodiment, the process of controlling or calculating degrees of parallelism performed by the adaptive power reduction component 122 may be accomplished utilizing two logic blocks; a power budget parallelism degree control loop 300 that calculates a new degree of parallelism based on power budget changes, and a power stabilizer feedback control loop 302 that calculates a new degree of parallelism to stabilize power consumption.

The process may begin by the SSD receiving a power limit command (block 304). As described above, the power limit command 124 may be sent to the SSD 104 from the host 102, for example. In response, it is determined if a power budget for the SSD has changed (block 306).

Determining if the power budget has changed may include calculating a delta value and using the delta value to calculate a new degree of parallelism. In one embodiment, the delta value may be obtained by determining a difference between a current power budget and a new power budget specified in the power limit command 124. For example, assume the current power budget of the SSD 104 is 25 W and a new power limit command specifies a new power budget of 12.5 W. The delta value may be then calculated to be 12.5 W or ½ the current power budget.

Note that the process may utilize four different parameters in two sets: a parallelism degree delta group increase parameter $D_I$ and a parallelism delta group decrease parameter $D_D$; and a parallelism degree step group increase parameter $S_I$ and a parallelism degree step group decrease parameter $S_D$. The parallelism degree delta group increase parameter $D_I$ and a delta group decrease parameter $D_D$ are set or controlled by the power budget parallelism degree control of 300, while the parallelism degree step group increase $S_I$ and step group decrease $S_D$ are set by the power consumption stabilizer feedback control loop 302, corresponding to each different type of strategy. The set of four parameters may be assigned to the processors 116, the memory 118 and the NVM devices 120 of the SSD and altered during operation of the SSD. At startup, the four parameters may be set to begin with a maximum degree power limit. In one embodiment, these parameters may be sent in the commands 128, 130 and 132 shown in FIG. 2.

Responsive to determining that the power budget has changed (block 306), then the power budget parallelism degree control loop 300 is invoked in which it is determined if the power budget has decreased (block 308). Responsive to determining that the power budget has decreased, then the parallelism degree may be decreased using the delta group decrease parameter $D_D$ (block 310). Responsive to determining that the power budget has not decreased, then the parallelism degree may be increased using the delta group increase parameter $D_I$ (block 312).

Increasing or decreasing parallelism may be determined by applying a mathematical model to the delta value, where the mathematical model may comprise a linear, exponential, mapping-based model, or the like. For example, assuming a linear or proportional model is used with a delta value of 12.5 W, which is ½ the current power budget, the new degree of parallelism will be ½ of a current degree of parallelism. As a result, the number of active processors 116, for example, can be halved after a transition period.

Responsive to determining that the power budget has not changed (block 306), then the power consumption feedback 126 is received, which indicates current power consumption of the SSD (block 314). In the power consumption stabilizer feedback control loop 302, it is determined if the current power consumption feedback 126 is less than the current power budget (block 318). Responsive to determining that the current power consumption feedback 126 is not less than the current power budget, then the parallelism degree may be decreased using the step group decrease $S_D$ parameter (block 320). Responsive to determining that the current power consumption feedback 126 is less than the current power budget (block 320), then the parallelism degree may be increased using the step group increase $S_I$ parameter (block 322).

Controlling different components or blocks of the SSD for multiple degrees of parallelism, as described above, can be gang scheduled—applied together over components at the same time, FIFO scheduled—any component will be first served once available for a transition to control the degree of parallelism, or other scheduling methods can be applied. Mappings of power consumption requirements to degrees of parallelism per component can be either symmetric or asymmetric, meaning that some components can have stiffer curves to reach the power budget changes. For example, with reduced power budgets, some components can reduce their degree by half, while other may reduce their degree to 75%. As a result, $D_I$ and $D_D$ are not only independent parameters per component, but also these can be either statically or dynamically configured according to the implementation.

Power consumption stabilizers work as feedback controllers to guarantee the average power consumption of the device is bounded. Unlike the $D_I$ and $D_D$ parameters, the $S_I$ and $S_D$ parameters to configure the feedback control mechanism can be P (proportional), I (integral), D (derivative) or any combination of these.

According to one example embodiment, responsive to any increase or decrease in the parallelism degree (blocks 310, 312, 320, 322), the adaptive power reduction component 122 changes operating parameters of one or more of the processor, the memory and the nonvolatile memory array, by invoking one or more of a processor activation command, a memory activation command, and a nonvolatile memory command (block 324). As stated above, control of the parallelism may be implemented through a parallelism control mechanism, including but not limited to, the use of one or more parallelism mapping tables, proportional-integral-derivative control, iterative methods: such as Nelder-Mead methods, machine learning, and optimization techniques, such as a neural network.

FIG. 3B is a diagram illustrating an example embodiment where the parallelism control mechanism is implemented as a parallelism mapping table. In this embodiment, each record in the table represent a different degree of parallelism, e.g. level 0-level 3, and each record has different values for the operating parameters of the processors, the memory and the nonvolatile memory array, respectively.

For example, responsive to any increase or decrease in the parallelism degree (e.g., from level 2 to level 1), the adaptive power reduction component 122 would use the parallelism degree as an index to the parallelism mapping table to look-up and apply the new operating parameter values for each component (e.g., deactivation of one core, an additional 25% rank power gating, and increasing the number of buffers). The parallelism mapping table can be either pre-programmed or user-programmable based on requirements. The parallelism mapping table may also be used and modified with or as part of an iterative and/or machine learning mechanism. For example, a machine learning mechanism may alter the contents of the table such that for each parallelism degree, the component parameters are set to provide the learned optimum usability for the overall system under the given power level.

According to one example embodiment, responsive to issuance of a processor activation command 128, a new hash function can be calculated that controls processor parallelism by activating/deactivating a different number of processors 116. Thereafter, the SSD transitions from the current hash function to the new hash function, thereby effectively implementing a new degree of parallelism. In the present embodiment, a hash function is used to permit the parallel degree control inside the SSD, whereas conventional hash functions were used to distribute job assignments across multiple processors inside the SSD.

Accordingly in the present embodiments, the power consumption feedback 126 may be used as an input to generate the processor activations commands 128, which trigger changes in the hash function. For example, assume a modulo operation is used for a hash function that is used for distributing jobs over multiple CPUs, and that the input for the modulo operation is a target LBA. Assuming also there are four CPUs, then the default hash function would be mod(LBA, 4). If the degree of parallelism needs to be reduced to 3, then the hash function will be changed to mod(LBA, 3). Until all outstanding operations are completed, both of these two hash functions need to be maintained simultaneously. Once all the outstanding operations are finished, the old hash function may be discarded, while the new hash function is continues in use.

The memory activation commands 130 may control memory parallelism, including memory pool length. In one embodiment, issuance of the memory activation command 130 may be used to control power-gated ranks. Power gating is a technique used in integrated circuit design to reduce power consumption, by shutting off current to blocks of the circuit that are not in use. DRAM dynamic power control can be done with any other techniques using as input the degree of parallelism in most cases.

The FTL commands 132 may control nonvolatile memory parallelism, including activation of different numbers of nonvolatile memory devices, or increasing/decreasing the number of buffers used in a memory pool.

The above process for adaptive power reduction for the SSD to dynamically control power consumption will now be described by way of further examples.

Figure 4A:
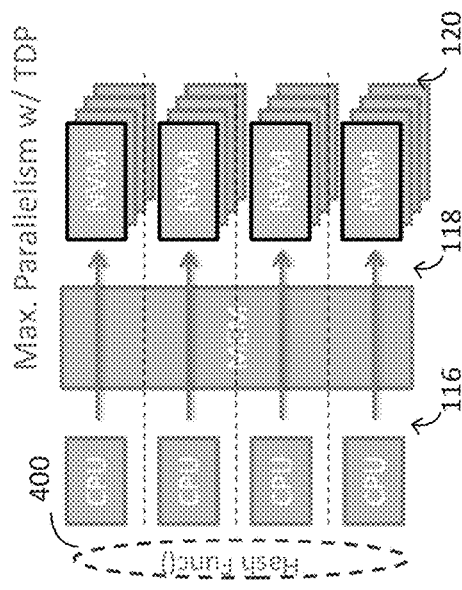
FIGS. 4A, 4B and 4C are conceptual diagrams showing an example of dynamic parallelism for controlling power consumption of the SSD via dynamic processor and job assignments.
Figure 4C:
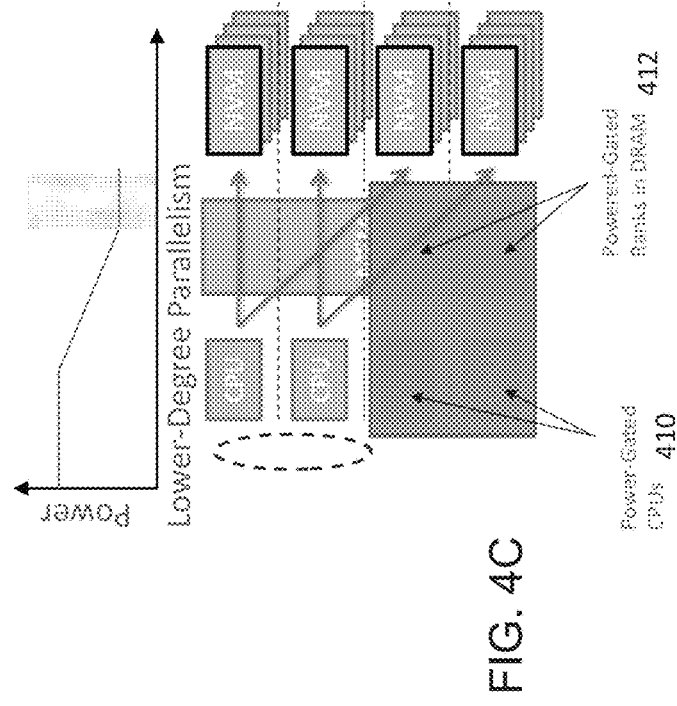
Figure 4B:
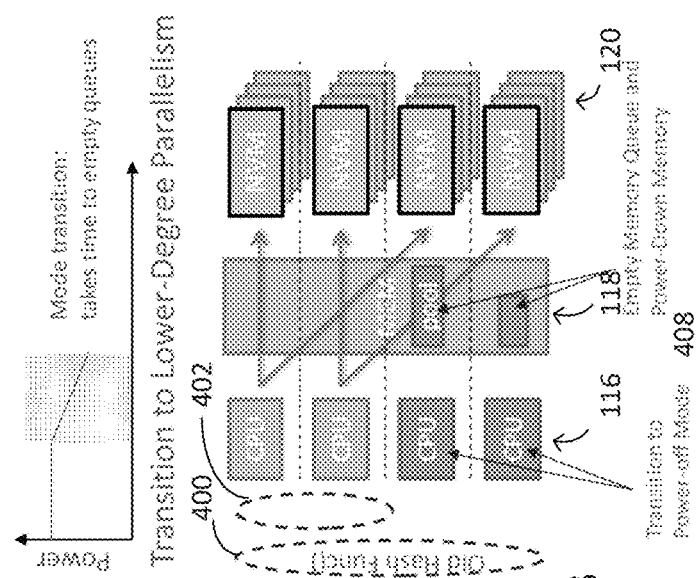

FIGS. 4A-4C are conceptual diagrams showing an example of dynamic parallelism for controlling power consumption of the SSD via dynamic processor and job assignments. FIG. 4A shows that a hash function 400 assigns command(s) and/or task(s) to each processor 116, which utilized the memory 118 and pass the command(s)/task(s) to the nonvolatile memory devices 120. In this example, four processors 116 are assumed, but any number of processors 116 may be utilized. In this case, the SSD is achieving its maximum parallelism and peak performance by utilizing all available processors 116 to simultaneously execute commands and tasks.

FIG. 4B shows the beginning of a transition to a lower degree of parallelism. When the degree of parallelism needs to be reduced (to half the current degree for example), the hash function 400 assigning the commands and tasks is updated, creating a new or modified hash function 402 that applies new mappings so that all subsequent commands and tasks will be mapped to a smaller number of processors 116.

During the transition to a lower degree of parallelism, all remaining commands and tasks, which are not finished yet, should be finished from the processor's 116 perspective and be emptied from the memory 118 to the NVM devices 120. Until such jobs are done, the processors 116 and/or DRAMs in the memory 118 that are supposed to be turned off (or otherwise put in a reduced power mode), are still active, but transitioning to the power off mode 408 and therefore not processing any new commands or tasks. Even during this stage, lower power consumption can be expected, as shown in the graph, because those processors 116 and memory queues in the memory 118 are flushing remaining jobs, resulting in reduced power utilization, rather than remaining in a steady state executing at full throttle.

FIG. 4C shows that once all commands and tasks are finished on those processors 116 and memory queues, they can be turned off and the SSD will consume lower power due to the lower degree of parallelism, as shown in the graph. This example shows an embodiment where power gating is implemented, such that power-gated CPUs 410 and power-gated ranks 412 in the memory 118 are completely powered-off. Note that the degree of parallelism in the processors 116 and the memory 118 can be controlled independently, although this example showed proportional activation for the simplicity.

The degree of parallelism can be further reduced if the updated power consumption meets the power constraints. This mechanism will be described in detail below.

Power consumptions per unit, processor, memory, and NVM devices, varies. Volatile memory (e.g., DRAM) operations are "cheaper" compared to direct read/programming/erasure on NAND flash, for example. These different power consumption characteristics can be used for power reduction in the SSD. Memory buffering, i.e., a memory pool, is commonly used in modern SSDs to hide NVM's latency. NVM devices are slower than volatile memory operations by orders of magnitude. According to one aspect of the example embodiments, the discrepancy in power consumption between the NVM devices 120 and volatile memory operations may also be utilized to reduce total power consumption of the SSD 104.

Figure 5C:
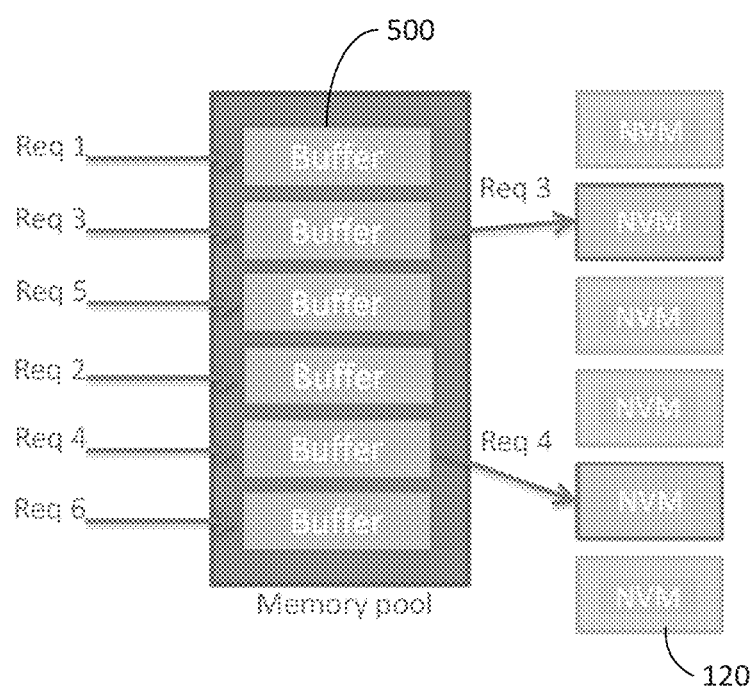

FIGS. 5A-5C are conceptual drawings showing an example of dynamic parallelism for controlling power consumption of the SSD via dynamic memory pool control for queueing requests towards the NVM devices. As shown in FIG. 5A, a memory pool of buffers 500 in memory 118 hold or buffer requests (Req. 1, 3, 5 and Req. 2, 4, 6) from the processor 116 towards the NVM devices 120, and the buffers 500 send as many request as allowed (if there's no pending operation in the NVM media, all request can be directly sent). In this example, six requests are sent simultaneously.

However, in the case where the power budget is constrained to a specific level, the memory pool may be increased to activate more buffers as long as the total capacity of the memory 118 can hold the requests, while reducing the number of active NVM devices 120, thereby reducing parallel NVM operations to accommodate the lower power budget. This is shown in FIG. 5B, where the memory pool is increased with additional buffers 500 hold the incoming requests because the number of active NVM devices 120 is reduced. In this example, only two request, Req. 1 and Req. 2, are sent simultaneously to two of the NVM devices 120. A third NVM device may be used to process Req. 3 after Req. 1 processing is done. Thus, in this example, all NVM devices may ultimately be accessible, but only two are active at any given time.

As shown in FIG. 5C, the increased buffers 500 holds Req. 3 and Req. 4 until those are serviceable at the (reduced) number of active NVM devices 120 allowed based on the constrained power budget. The number of simultaneous requests processed may be controlled by the power consumption feedback described in FIGS. 2 and 3.

Dynamic Write Interleaving Control

As briefly described above, NVM media (NAND flash for example), is slower than volatile memory and moreover, it has asymmetric characteristics in read/write (programming/erasure) both in performance (latency) and power consumption. To mainly hide the slow latency, modern SSDs are commonly organized to utilize parallelism. Such parallelism includes multiple channels, ways, and planes. Channels can be understood as separate control and data paths that potentially increase the operation bandwidths. Ways are commonly understood as isolated chip selections (CE pins) for enabling each NVM die or package. For example, inside a NAND die, there are planes that usually share bit lines (BL) in a NAND cell array.

From the SSD-system perspective, multiples combinations of the above types of parallelism (num. of channels, num. of ways and num. of planes) can be considered as the maximum degree of parallelism of a given NVM media organization as shown in the Equation below.

$$\text{Max degree} = (\text{num of channels}) \times (\text{num of ways}) \times (\text{num of planes})$$

According to another aspect of the example embodiments, this degree of parallelism can be dynamically controlled under the given power constraints. For example, way-interleaving is widely used to hide programming latencies.

Figures 6A, 6B:
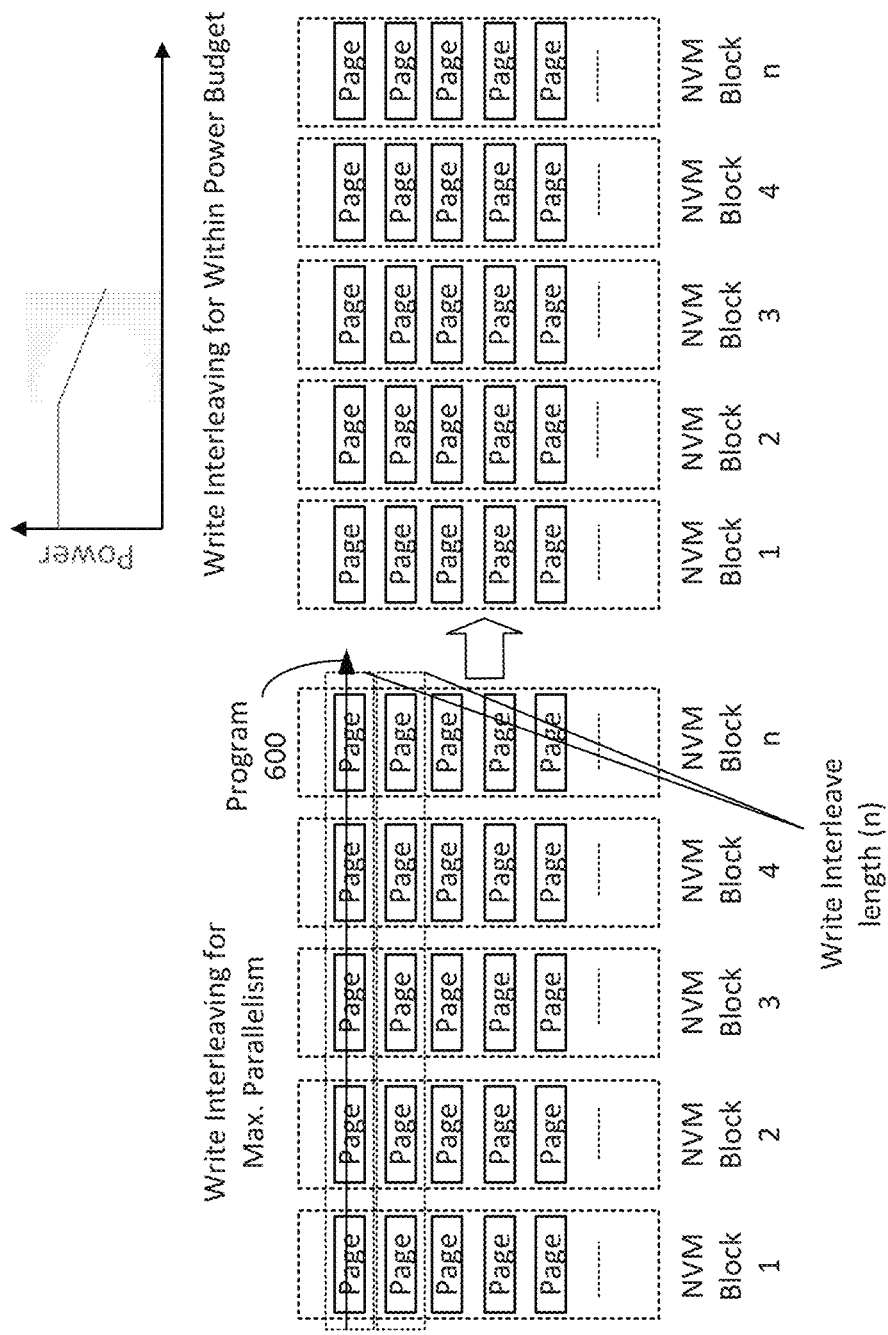
FIGS. 6A-6C are conceptual drawing showing dynamic parallelism for controlling power consumption of the SSD via way interleaving.
Figure 6C:
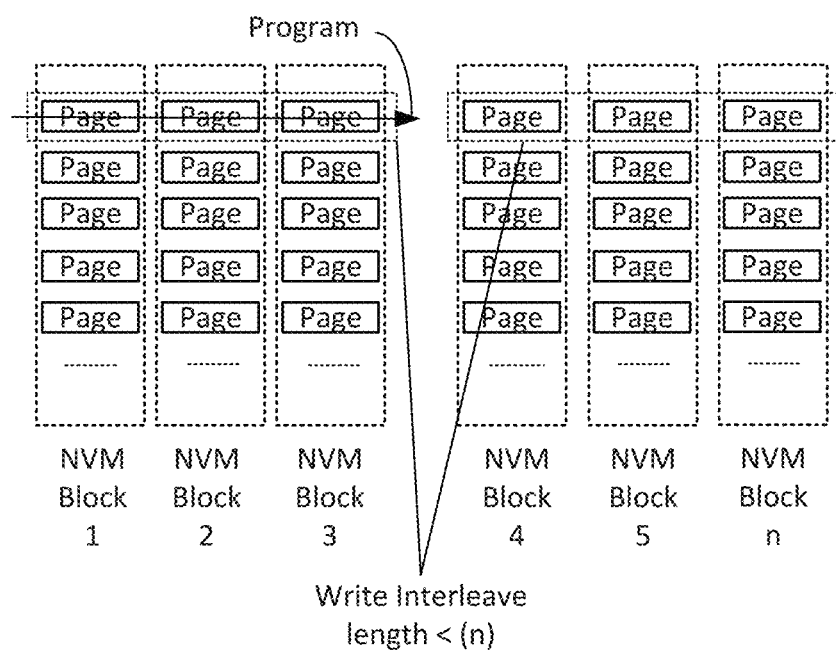

FIGS. 6A-6C are conceptual drawing showing an example of dynamic parallelism for controlling power consumption of the SSD via way interleaving. FIG. 6A shows NVM memory accesses being interleaved across multiple NVM r blocks simultaneously. In the example shown, a program 600 is performing write (or way) interleaving where data are split up into N blocks and written to or read from N NVM device pages at the same time for maximum parallelism. In this case, the write interleave length is N.

As shown by the graph in FIG. 6B, although utilizing maximum parallelism is suitable to achieve the best performance, the example embodiments can instead reduce the degree of parallelism to reduce the power consumption of the device to stay within the power budget by decreasing the write interleaving width.

As shown in FIG. 6C, decreasing the write interleaving width (to less than N in this example) can reduce the power consumption of NVM media by reducing the number of simultaneously active NVM blocks, resulting in a lower parallelism degree.

A method and system for adaptive power reduction for a solid-state storage device to dynamically control power consumption has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A method for adaptive power reduction for a solid-state storage device to dynamically control power consumption, the method comprising:
   receiving a power limit command from a host at the solid-state storage device, the solid-state storage device including a plurality of processors, a memory and a plurality of nonvolatile memory devices;
   receiving power consumption feedback;
   using the power limit command and the power consumption feedback to calculate a new degree of parallelism for the solid-state storage device;
   using the new degree of parallelism to control power consumption of the solid-state storage device to be within an allowed power budget over a given time window by controlling one or more of: i) processor parallelism, including activation of different numbers of processors within the solid-state storage device, ii) memory parallelism, including memory pool length for the memory of the solid-state storage device; and iii) nonvolatile memory parallelism, including activation of different numbers of nonvolatile memory devices within the solid-state storage device;
   wherein the using the new degree of parallelism to control the one or more of the processor parallelism, memory parallelism and nonvolatile memory parallelism further includes providing a control signal to a voltage regulator to cause a voltage manager to output a different voltage to one or more of the processors, the memory and the nonvolatile memory devices; and
   wherein the method is performed by a control circuit operating within the solid-state storage device, but external to the nonvolatile memory array.

2. The method of claim 1, further comprising:
   responsive to any increase or decrease in the parallelism degree, changing operating parameters of one or more of the processor, the memory and the nonvolatile memory array, by invoking one or more of a processor activation command, a memory activation command, and a nonvolatile memory command.

3. The method of claim 2, further comprising:
   responsive to issuance of the processor activation command, calculating a new hash function based on the new degree of parallelism; and
   transitioning from a current hash function to the new hash function to control processor parallelism.

4. The method of claim 1, wherein the power limit command includes the allowed power budget over the given time window.

5. The method of claim 1, wherein the power consumption feedback represents measurements of power consumption of one or more of the processors, and the nonvolatile memory array.

6. The method of claim 1, wherein the control circuit writes to registers of one or more of the processes, the memory and the nonvolatile memory devices.

7. The method of claim 1, wherein receiving the power limit command further comprises:
   determining if a power budget has changed by determining a difference between a current power budget and a new power budget specified in the power limit command.

8. The method of claim 7, further comprising:
   responsive to determining that the power budget has changed, invoking a power budget parallelism degree control loop that determines if the power budget has decreased;
   responsive to the power budget decreasing, decreasing the parallelism degree; and
   responsive to the power budget increasing, increasing the parallelism degree.

9. A method for adaptive power reduction for a solid-state storage device to dynamically control power consumption, the method comprising:
   receiving a power limit command from a host, wherein receiving the power limit command further includes
      determining if a power budget has changed by determining a difference between a current power budget and a new power budget specified in the power limit command;
   receiving power consumption feedback;
   using the power limit command and the power consumption feedback to calculate a new degree of parallelism, wherein calculating the new degree of parallelism further comprises:
      responsive to determining that the power budget has not changed, then receiving the power consumption feedback;
      invoking a power consumption stabilizer feedback control loop that determines if the current power consumption feedback is less than the current power budget;
      responsive to determining that the current power consumption feedback is not less than the current power budget, then decreasing the parallelism degree; and
      responsive to determining that the current power consumption feedback is less than the current power budget, then increasing the parallelism degree;
   responsive to determining that the power budget has changed, invoking a power budget parallelism degree control loop that determines if the power budget has decreased;
   responsive to the power budget decreasing, decreasing the parallelism degree; and
   responsive to the power budget increasing, increasing the parallelism degree;
   using the new degree of parallelism to control one or more of: i) processor parallelism, including activation of different numbers of processors, ii) memory parallelism, including memory pool length; and iii) nonvolatile memory parallelism, including activation of different numbers of nonvolatile memory devices.

10. A solid-state storage device, comprising:
    a volatile memory;
    a plurality of processors coupled to the volatile memory;
    a nonvolatile memory array including a plurality of nonvolatile memory devices; and
    a control circuit coupled to the volatile memory, the plurality of processors and the nonvolatile memory array, the control circuit configured to:
       receive a power limit command from a host;
       receive power consumption feedback;
       use the power limit command and the power consumption feedback to calculate a new degree of parallelism within the solid-state storage device; and
       use the new degree of parallelism for the solid-state storage device to control power consumption of the solid-state storage device to be within an allowed power budget over a given time window by controlling one or more of: i) processor parallelism, including activation of different numbers of processors within the solid-state storage device, ii) memory parallelism, including memory pool length for the solid-state storage device; and iii) nonvolatile memory parallelism, including activation of different numbers of the plurality of nonvolatile memory devices of the nonvolatile memory array within the solid-state storage device;

wherein the control circuit transmits a control signal to a voltage regulator to cause a voltage manager to output a different voltage to one or more of the processors, the memory and the nonvolatile memory devices; and wherein the control circuit operates within the solid-state storage device, but external to the nonvolatile memory array.

11. The solid-state storage device of claim 10, wherein the control circuit is further configured to:

responsive to any increase or decrease in the parallelism degree, change operating parameters of one or more of the processor, the memory and the nonvolatile memory array, by invoking one or more of a processor activation command, a memory activation command, and a nonvolatile memory command.

12. The solid-state storage device of claim 10, wherein the control circuit is further configured to:

responsive to issuance of the processor activation command, calculate a new hash function based on the new degree of parallelism; and transition from a current hash function to the new hash function to control processor parallelism.

13. The solid-state storage device of claim 10, wherein the power consumption feedback represents measurements of power consumption of one or more of the processors, and the nonvolatile memory array.

14. The solid-state storage device of claim 10, wherein the control circuit writes to registers of one or more of the processes, the memory and the nonvolatile memory devices.

15. The solid-state storage device of claim 10, wherein the control circuit receives the power limit and determines if a power budget has changed by determining a difference between a current power budget and a new power budget specified in the power limit command.

16. The storage device of claim 15, wherein:

responsive to determining that the power budget has changed, the control circuit invokes a power budget parallelism degree control loop that determines if the power budget has decreased;

responsive to the power budget decreasing, the control circuit decreases the parallelism degree; and responsive to the power budget increasing, the control circuit increases the parallelism degree.

17. A storage device, comprising:
a volatile memory;
a plurality of processors coupled to the volatile memory;
a nonvolatile memory array; and
a control circuit coupled to the volatile memory, the plurality of processors and the nonvolatile memory array, the control circuit configured to:
receive a power limit command from a host and determine if a power budget has changed by determining a difference between a current power budget and a new power budget specified in the power limit command;
receive power consumption feedback;
use the power limit command and the power consumption feedback to calculate a new degree of parallelism wherein the new degree of parallelism is calculated by:
responsive to determining that the power budget has not changed, the control circuit receives the power consumption feedback;

the control circuit invokes a power consumption stabilizer feedback control loop that determines if the current power consumption feedback is less than the current power budget;

responsive to determining that the current power consumption feedback is not less than the current power budget, then the control circuit decreases the parallelism degree; and responsive to determining that the current power consumption feedback is less than the current power budget, then the control circuit increases the parallelism degree; and use the new degree of parallelism to control one or more of: i) processor parallelism, including activation of different numbers of processors, ii) memory parallelism, including memory pool length; and iii) nonvolatile memory parallelism, including activation of different numbers of nonvolatile memory devices; and wherein responsive to determining that the power budget has changed, the control circuit invokes a power budget parallelism degree control loop that determines if the power budget has decreased;

responsive to the power budget decreasing, the control circuit decreases the parallelism degree; and responsive to the power budget increasing, the control circuit increases the parallelism degree.

18. A method for adaptive power reduction for a solid-state storage device to dynamically control power consumption, the method comprising:

receiving a power limit command from a host at the solid-state storage device, the solid-state storage device including a plurality of processors, a memory and a plurality of nonvolatile memory devices;

receiving power consumption feedback;

using the power limit command and the power consumption feedback to calculate a new degree of parallelism for the solid-state storage device;

using the new degree of parallelism to control power consumption of the solid-state storage device to be within an allowed power budget over a given time window by controlling one or more of: i) processor parallelism, including activation of different numbers of processors within the solid-state storage device, ii) memory parallelism, including memory pool length for the memory of the solid-state storage device; and iii) nonvolatile memory parallelism, including activation of different numbers of nonvolatile memory devices within the solid-state storage device;

determining if a power budget has changed; and wherein calculating the new degree of parallelism further comprises responsive to determining that the power budget has not changed, then receiving the power consumption feedback;

invoking a power consumption stabilizer feedback control loop that determines if the current power consumption feedback is less than the current power budget;

responsive to determining that the current power consumption feedback is not less than the current power budget, then decreasing the parallelism degree; and responsive to determining that the current power consumption feedback is less than the current power budget, then increasing the parallelism degree.

19. A solid-state storage device, comprising:
a volatile memory;
a plurality of processors coupled to the volatile memory;
a nonvolatile memory array including a plurality of nonvolatile memory devices; and
a control circuit coupled to the volatile memory, the plurality of processors and the nonvolatile memory array, the control circuit configured to:
  receive a power limit command from a host;
  receive power consumption feedback;
  use the power limit command and the power consumption feedback to calculate a new degree of parallelism within the solid-state storage device; and
  use the new degree of parallelism for the solid-state storage device to control power consumption of the solid-state storage device to be within an allowed power budget over a given time window by controlling one or more of: i) processor parallelism, including activation of different numbers of processors within the solid-state storage device, ii) memory parallelism, including memory pool length for the solid-state storage device; and iii) nonvolatile memory parallelism, including activation of different numbers of the plurality of nonvolatile memory devices of the nonvolatile memory array within the solid-state storage device;
wherein control circuit is further configured to:
determine if a power budget has changed; and wherein the new degree of parallelism is calculated by
  responsive to determining that the power budget has not changed, then receiving the power consumption feedback;
  invoking a power consumption stabilizer feedback control loop that determines if the current power consumption feedback is less than the current power budget;
  responsive to determining that the current power consumption feedback is not less than the current power budget, then decreasing the parallelism degree; and
  responsive to determining that the current power consumption feedback is less than the current power budget, then increasing the parallelism degree.

* * * * *